(12) United States Patent
Kipp et al.

(10) Patent No.: US 9,839,874 B2
(45) Date of Patent: Dec. 12, 2017

(54) METHOD AND DEVICE FOR THE REGENERATION OF A TWO-CHAMBER AIR DRYER

(71) Applicant: KNORR-BREMSE SYSTEME FÜR SCHIENENFAHRZEUGE GMBH, Munich (DE)

(72) Inventors: Thomas Kipp, Munich (DE); Christian Urra, Munich (DE); Thomas Merkel, Hürth (DE); Gert Assmann, Munich (DE)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 19 days.

(21) Appl. No.: 14/914,831

(22) PCT Filed: Aug. 28, 2014

(86) PCT No.: PCT/EP2014/068217
§ 371 (c)(1),
(2) Date: Feb. 26, 2016

(87) PCT Pub. No.: WO2015/028533
PCT Pub. Date: Mar. 5, 2015

(65) Prior Publication Data
US 2016/0214054 A1    Jul. 28, 2016

(30) Foreign Application Priority Data

Aug. 30, 2013    (DE) .................. 10 2013 109 476

(51) Int. Cl.
*B01D 53/04*    (2006.01)
*B01D 53/26*    (2006.01)
(Continued)

(52) U.S. Cl.
CPC ....... *B01D 53/261* (2013.01); *B01D 53/0446* (2013.01); *B60T 17/002* (2013.01);
(Continued)

(58) Field of Classification Search
CPC .. B01D 53/04; B01D 53/0446; B01D 53/261; B01D 2257/80; B01D 2259/40003;
(Continued)

(56) References Cited

U.S. PATENT DOCUMENTS 3,923,479 A * 12/1975 Glass .................... B01D 53/26
55/302
4,812,148 A    3/1989 Hata et al.
(Continued)

FOREIGN PATENT DOCUMENTS

CN        102101003 A        6/2011
CN        102872688 A        1/2013
(Continued)

OTHER PUBLICATIONS

Chinese Office Action for Chinese Application No. 201480047706.1, dated Sep. 5, 2016, along with English translation.
(Continued)

*Primary Examiner* — Frank Lawrence
(74) *Attorney, Agent, or Firm* — Barnes & Thornburg LLP

(57) ABSTRACT

A method and device for regeneration of an adsorption air dryer having at least two desiccant-filled drying vessels connected in parallel, wherein a humid compressed-air stream generated by a compressor flows through one of the drying vessels in a drying phase and a dry compressed-air stream flows through the other drying vessel, for the purpose of dewatering the desiccant, in a simultaneous regeneration phase, wherein a valve arrangement is provided for switching the drying vessels alternately between drying phase and
(Continued)

regeneration phase during normal operation, wherein the control mechanism are provided for implementing a post-regeneration phase, which control mechanism initiates a further flow through the drying vessel with dry compressed air for complete regeneration and also a flow through the other drying vessel; with dry compressed air for complete regeneration, so that, upon the next start of operation of the adsorption air dryer, operation commences with fully regenerated drying vessels.

6 Claims, 1 Drawing Sheet

(51) Int. Cl.
*B60T 17/00* (2006.01)
*F15B 21/04* (2006.01)

(52) U.S. Cl.
CPC .......... *F15B 21/041* (2013.01); *F15B 21/048* (2013.01); *B01D 2257/80* (2013.01); *B01D 2259/40003* (2013.01); *B01D 2259/40086* (2013.01); *B01D 2259/4566* (2013.01)

(58) Field of Classification Search
CPC .. B01D 2259/40086; B01D 2259/4566; B60T 17/002; F15B 21/041; F15B 21/048
USPC ....... 95/117, 121, 122; 96/121, 130; 34/472, 34/473, 80
See application file for complete search history.

(56) References Cited

U.S. PATENT DOCUMENTS

| | | | | |
|---|---|---|---|---|
| 5,209,764 A | * | 5/1993 | Eberling | ............ B01D 53/0415 96/114 |
| 5,286,282 A | * | 2/1994 | Goodell | ................ B60T 17/004 96/113 |
| 2012/0031273 A1 | * | 2/2012 | Heer | .................... B01D 53/261 96/116 |

FOREIGN PATENT DOCUMENTS

| | | |
|---|---|---|
| CN | 104321232 A | 1/2015 |
| DE | 3533893 A1 | 3/1987 |
| DE | 4219101 A1 | 12/1993 |
| DE | 102010018949 A1 | 11/2011 |
| DE | 102010031306 A1 | 1/2012 |
| DE | 102012007028 A1 | 10/2013 |
| JP | 2004146393 A | 5/2004 |
| WO | 2013150110 A2 | 10/2013 |

OTHER PUBLICATIONS

Search Report for German Patent Application No. 10 2013 109 4761; dated May 2, 2014.
Search Report for International Patent Application No. PCT/EP2014/068217; dated Dec. 22, 2014.
Notification Concerning Transmittal of the International Preliminary Report on Patentability, International Search Report and the Written Opinion of the International Searching Authority, along with the English Translation, dated Aug. 28, 2014 for International Application No. PCT/EP2014/068217.

\* cited by examiner

METHOD AND DEVICE FOR THE REGENERATION OF A TWO-CHAMBER AIR DRYER

PRIORITY CLAIM

This patent application is a U.S. National Phase of International Patent Application No. PCT/EP2014/068217, filed 28 Aug. 2014, which claims priority to German Patent Application No. 10 2013 109 476.7, filed 30 Aug. 2013, the disclosures of which are incorporated herein by reference in their entirety.

FIELD

Illustrative embodiments relate to a method and a device for the regeneration of an adsorption air dryer which is operated by at least two drying containers which are connected in parallel to one another, are filled with drying agent, and of which a moist compressed air stream which is generated by a compressor is dried by way of one of the drying containers in a drying phase, and the other drying container is flowed through in a simultaneous regeneration phase by a dry compressed air stream to dewater the drying agent, a valve-controlled two-way switchover of the drying containers between the drying phase and the regeneration phase being carried out during normal operation of the adsorption air dryer.

BACKGROUND

The field of use extends principally to compressed air systems for rail vehicle construction. Here, a compressor which is usually arranged in a train vehicle generates compressed air for driving the pneumatic brake system and optionally further assemblies. Moreover, the solution can also be applied to absorption air dryers of other vehicles which perform alternating operation between a drying phase and a regeneration phase.

Illustrative embodiments provide a method and a device for the regeneration of an adsorption air dryer, which method/device avoids operational disruptions during operational starting by way of simple technical means and makes longer utilization of the drying agent possible.

BRIEF DESCRIPTION OF THE FIGURES

Exemplary embodiments will be discussed in greater detail in the following text together with the figures, in which.

DETAILED DESCRIPTION OF THE DISCLOSED EMBODIMENTS

Figure 1:
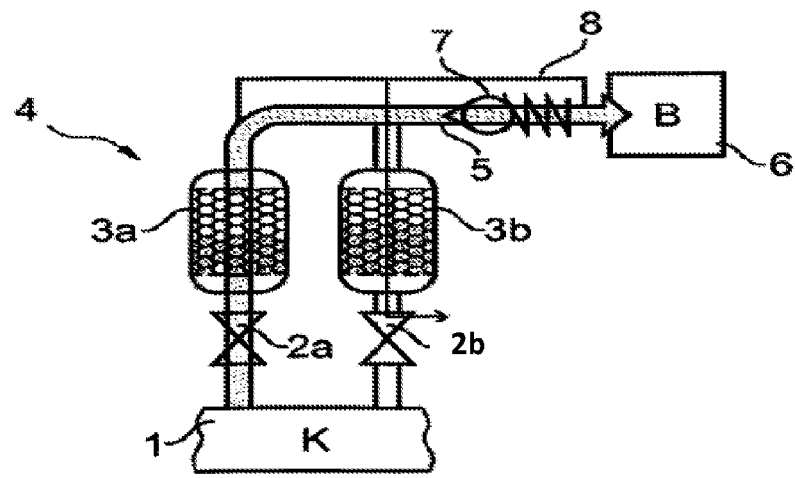
FIG. 1 shows a diagrammatic illustration of an adsorption air dryer during normal operation.

Disclosed embodiments include the teaching in terms of the method that, after ending of normal operation of the adsorption air dryer, the drying container which was still in the regeneration phase up to then is regenerated completely by way of a further throughflow with dry compressed air, and the other drying container which was in the drying phase up to then is also regenerated completely by way of a switchover to a throughflow with dry compressed air, to begin the next operating start of the adsorption air dryer with completely regenerated drying containers.

In other words, when the vehicle is switched off, the drying containers of the adsorption air dryer are regenerated completely, for which purpose the dry air from a supply air reservoir may be used.

During the next operating start of the vehicle, preheating of the adsorption air dryer is no longer required. As a result of the dewatering of the drying agent which is carried out immediately after normal operation has ended, the capability of the drying agent to absorb water is protected, which also has the effect of extending the service life. Furthermore, the compressed air consumption in the phase of the operational starting is lowered and the time duration until driving readiness is shortened.

During normal operation of the adsorption air dryer, the dry compressed air which is used for the regeneration of the drying container which is in the regeneration phase may branch off from the main air stream which leaves the other drying container which is in the drying phase on the outlet side. As a result, the regeneration can be carried out during normal operation without additional storage of dry compressed air.

In contrast, after ending of normal operation, the dry compressed air which is used for the subsequent regeneration of the drying containers may branch off from the main air stream which flows back from a supply pressure reservoir which is connected downstream of the adsorption air dryer. Dry compressed air which, stored in the supply pressure reservoir, is no longer required in any case can therefore be used for the subsequent regeneration of the drying containers after ending of normal operation. This results in efficient subsequent use of the stored pressure energy.

According to at least one disclosed embodiment, the dry compressed air which flows out of both drying containers on the outlet side opens into a common compressed air line which conducts the main air stream to the supply pressure reservoir. Therefore, the dry compressed air is merged herein and can be removed for regeneration purposes at this location in the vicinity of the drying containers. To avoid a return flow of dry compressed air into the drying containers via the compressed air line which conducts the main air stream during the regeneration phase, it is proposed that a check valve is inserted into the compressed air line. To this extent, the checking action takes place in the direction of the drying containers.

A branch line may branch off from the compressed air line which conducts the main air stream in the region between the check valve and the supply pressure reservoir, which branch line opens into the drying containers for regeneration of the drying agent.

According to at least one disclosed embodiment, a valve arrangement is arranged on the inlet side of the drying containers for the two-way switchover of the drying containers between the drying phase and the regeneration phase. The valve arrangement can be combined as a common valve block or can be configured as individual valves per drying container. Electropneumatic valves may be used which are operated from a central electronic control unit alternatingly between the drying phase and the regeneration phase. During the subsequent regeneration, the valve arrangement should be in the closed position.

According to FIG. 1, during normal operation of a rail vehicle, a compressor delivers compressed air via a valve arrangement 2a, 2b alternatingly to one of two drying containers 3a and 3b which are a constituent part of an adsorption air dryer 4. Here, the valve 2a of the valve arrangement establishes a connection between the compressor 1 and the drying chamber 3a, whereas the other drying chamber 3b is not connected to the compressor 1 as a consequence of the closed valve 2b of the valve arrangement, but rather is connected to the atmosphere to ventilate the drying chamber 3b.

On the outlet side of the drying containers 3a and 3b, a compressed air line 5 merges the two part air streams of the drying containers 3a and 3b to form a main air stream of dry compressed air which is introduced into a supply pressure reservoir 6.

A check valve 7 with a blocking action in the direction of the drying containers 3a and 3b is arranged in the compressed air line 5, to avoid a return flow of dry compressed air into the drying containers 3a and 3b by the pressure line 5 which conducts the main air stream during the regeneration phase. A branch line 8 branches off from the compressed air line 5 in the region between the check valve 7 and the supply pressure reservoir 6, which branch line 8 opens into the drying containers 3a and 3b to supply dry compressed air for the purpose of regeneration.

The valve arrangement 2a and 2b is switched over by an electronic controller (not shown in further detail) in a manner controlled according to time or requirement, to switch over the drying container 3a with drying agent which is then saturated with water from the drying phase into the regeneration phase. At the same time, the other drying container 3b which is in the regeneration phase is switched over into the drying phase, to ensure a continuous delivery of dry compressed air. This change is repeated during normal operation of the adsorption air dryer and of the vehicle which contains the latter.

Figure 2:
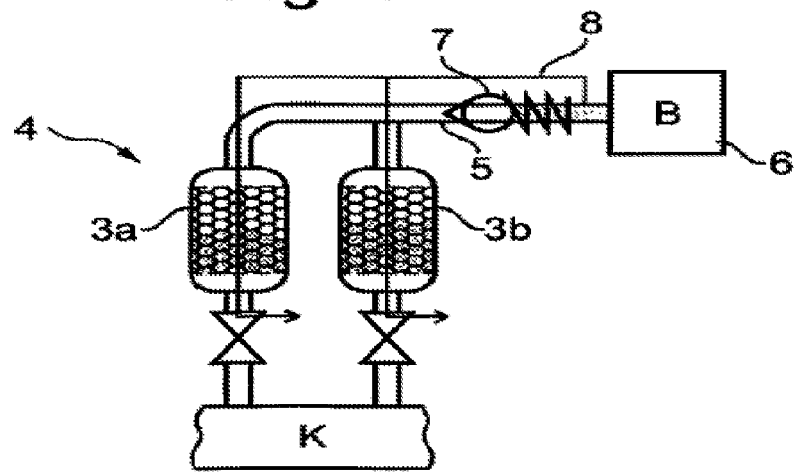
FIG. 2 shows a diagrammatic illustration of an adsorption air dryer during the subsequent regeneration phase.

According to FIG. 2, after the vehicle is switched off, that is to say after ending of normal operation, a subsequent regeneration of both drying containers 3a and 3b is performed. Accordingly, the drying container 3b which was still in the regeneration phase up to then is fully regenerated to completion by way of dry compressed air which is removed from the filled supply pressure reservoir 6 after ending of normal operation. Here, the check valve 7 ensures that no further pressure loss takes place, by it being prevented that compressed air passes from the supply pressure reservoir 6 via the main air line 5 back into the drying containers 3a and 3b.

Figure 3:
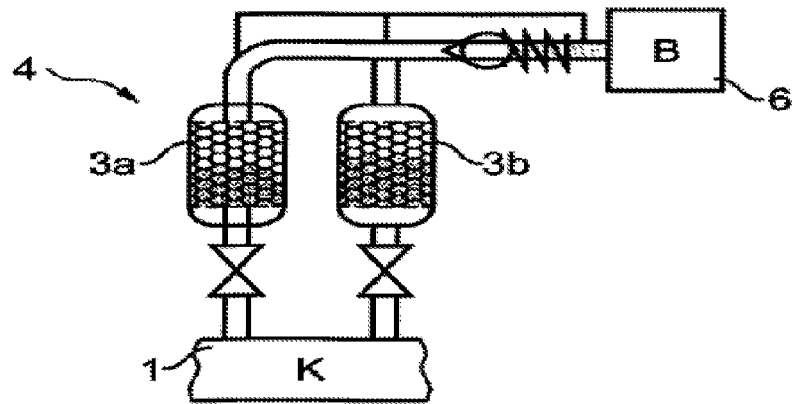
FIG. 3 shows a diagrammatic illustration of an adsorption air dryer after the subsequent regeneration of the drying containers has ended.

The other drying container 3a which is in the drying phase until ending of normal operation is also regenerated completely during the subsequent regeneration phase as a result of a switchover to a throughflow with dry compressed air. It is therefore ensured according to FIG. 3 that the beginning can take place with completely regenerated drying containers 3a and 3b during the next operating start of the vehicle and the adsorption air dryer which is arranged herein.

The field of use extends principally to compressed air systems for rail vehicle construction. Here, a compressor which is usually arranged in a train vehicle generates compressed air for driving the pneumatic brake system and optionally further assemblies. Moreover, the solution can also be applied to absorption air dryers of other vehicles which perform alternating operation between a drying phase and a regeneration phase.

An adsorption air dryer, in particular for the compressed air supply of the brake systems of vehicles, is apparent from DE 35 33 893 A1, which adsorption air dryer, i.e., a two chamber variant, has two drying containers with drying agent which are connected in parallel to one another. They are operated in parallel to one another alternately during a drying and regeneration phase, to ensure a permanent compressed air supply with dry compressed air. The switchover between the drying phase and the regeneration phase takes place by way of a valve mechanism which can be switched according to a time cycle and alternately introduces the moist compressed air coming from the compressor into one of the drying containers and discharges the part air quantity used during the regeneration in each case from the other drying container. The valve mechanism consists of a switching valve with two individual valves which operate alternatingly and can be controlled by way of a single solenoid valve.

The problem arises in practice that normal operation of the adsorption air dryer is interrupted after the rail vehicle is switched off with an undefined loading as a result of water in the drying agent. The drying agent wears out prematurely as a result of the damp storage. In the case of a renewed operating start of the rail vehicle and therefore of the compressor operation at temperatures below freezing, complicated preheating of the adsorption air dryer is therefore required. The susceptibility to operational disruptions, such as the formation of ice, rises on account of these cumbersome starting conditions.

LIST OF DESIGNATIONS

1 Compressor
2 Valve arrangement
3 Drying container
4 Adsorption air dryer
5 Main air line
6 Supply pressure reservoir
7 Check valve
8 Branch line

The invention claimed is:

1. A method for the regeneration of an adsorption air dryer which is operated by way of at least two drying containers connected in parallel to one another, the method comprising:
  filling the at least two drying containers with drying agent so as to dry a moist compressed air stream which is generated by a compressor using the drying agent included in one of the drying containers in a drying phase, while a dry compressed air stream is flowed through the other drying container in a simultaneous regeneration phase to dewater the drying agent contained therein; and
  carrying out a valve-controlled two-way switchover of the at least two drying containers between the drying phase and the regeneration phase during normal operation,
  wherein, after ending of normal operation, the drying container which was in the regeneration phase at that time is regenerated completely via a further throughflow with dry compressed air, and the other drying container which was in the drying phase up to then at that time is also regenerated completely via a switchover to a throughflow with dry compressed air, so as to begin a next operating start of the adsorption air dryer with completely regenerated drying containers,
  wherein, during normal operation, the dry compressed air which is used for the regeneration of the drying container which is in the regeneration phase is branched off from the main air stream which leaves the other drying container in the drying phase on the outlet side.

2. The method of claim 1, wherein, after ending of normal operation, the dry compressed air used for the subsequent regeneration of the drying containers is branched off from the main air stream which flows back from a supply pressure reservoir connected downstream of the adsorption air dryer.

3. A device for the regeneration of an adsorption air dryer having at least two drying containers connected in parallel to one another, which are filled with drying agent, through one of which, a moist compressed air stream generated by a compressor flows through in a drying phase, the device comprising:
- a compressor that supplies a dry compressed air stream flowed through the other drying container in a simultaneous regeneration phase to dewater the drying agent;
- a valve arrangement provided for a two-way switchover of the at least two drying containers during normal operation between the drying phase and the regeneration phase; and
- a controller provided for carrying out a subsequent regeneration phase, which controller initiates a further throughflow of the one drying container with dry compressed air for complete regeneration and also throughflow of the other drying container with dry compressed air for complete regeneration, so as to begin a next operating start of the adsorption air dryer with completely regenerated drying containers, and wherein a valve arrangement is provided for the two-way switchover of the at least two drying containers between the drying phase and the regeneration phase, which valve arrangement is arranged such that it is connected downstream of the compressor, on the inlet side of the drying containers.

4. The device of claim 3, wherein the dry compressed air which flows out of the at least two drying containers on an outlet side opens into a common compressed air line which conducts the main air stream to a supply pressure reservoir.

5. The device of claim 4, wherein a check valve is arranged in the compressed air line, to avoid a return flow of dry compressed air into the at least two drying containers via the compressed air line which conducts the main air stream during the regeneration phase.

6. The device of claim 5, wherein a branch line branches off from the compressed air line which conducts the main air stream in a region between the check valve and the supply pressure reservoir, which branch line opens into the at least two drying containers for regeneration.

\* \* \* \* \*